United States Patent [19]

Obstfelder et al.

[11] Patent Number: 4,587,411

[45] Date of Patent: May 6, 1986

[54] METHOD OF PRINTING, EVALUATING AND CHECKING THE PRINTING IMAGE OF A PRINTER AND APPARATUS FOR CARRYING OUT SAID PROCESS

[75] Inventors: Günther Obstfelder, Weinheim-Lützelsachsen; Gerhard Kreutze, Neckarsteinach; Winfried Lüttig, Heiligkreuzsteinach, all of Fed. Rep. of Germany

[73] Assignee: F & O Electronic Systems GmbH & Co., Neckarsteinach, Fed. Rep. of Germany

[21] Appl. No.: 568,091

[22] Filed: Jan. 4, 1984

[30] Foreign Application Priority Data

Jan. 4, 1983 [DE] Fed. Rep. of Germany ....... 3300081

[51] Int. Cl.⁴ ............................................. G06K 5/00
[52] U.S. Cl. .................................. 235/437; 235/432; 235/462; 235/475; 346/76 PH
[58] Field of Search ............... 235/437, 462, 475, 432; 346/76 PH

[56] References Cited

U.S. PATENT DOCUMENTS

| 3,857,020 | 12/1974 | Higginbotham et al. | 235/462 |
| 4,349,741 | 9/1982 | Bobart et al. | 235/462 |
| 4,423,424 | 12/1983 | Takayama | 346/76 PH |

*Primary Examiner*—David L. Trafton
*Attorney, Agent, or Firm*—Staas & Halsey

[57] ABSTRACT

A method of printing and checking a printing image, e.g., bar codes, of a thermoprinter. The just-printed printing image is scanned after printout of a portion of the printing image on the paper web by means of an opto-electronic sensor which can move relative to the paper web, reading the just-printed printing image in the process. The read result is compared and checked with the originally entered data and, if an error is detected, the remainder of the printing image still to be printed or the just-printed printing image is marked by the printer as unusable, e.g., blackened.

33 Claims, 9 Drawing Figures

METHOD OF PRINTING, EVALUATING AND CHECKING THE PRINTING IMAGE OF A PRINTER AND APPARATUS FOR CARRYING OUT SAID PROCESS

BACKGROUND OF THE INVENTION

The invention relates to a method of printing, evaluating and checking the printing image of an electrically activated printer, more particularly a thermoprinter for bar codes, in which data to be printed are entered in the printer manually by means of a keyboard or electrically from a storage and the paper web to be printed is transported through the printer by means of a motor. Moreover, the invention is concerned with an apparatus for carrying out said method.

Several methods of printing labels and simultaneous labelling have become known, in which the printing and labelling process occurs by means of a hand unit. Unexamined West German Application No. 32 09 053 discloses a method in which, by using a manually operated control mechanism during successive work cycles, said mechanism can be operated, whereby in each cycle a print head prints a label, the printed label is detached and brought to a label-applying position relatively to a label-applying roller, ink is put on the print head in each cycle, and thereafter the printing image is then printed on the label, whereupon the printed label is transported further. In this method, the hand labelling unit is prevented from operating beyond a prespecified number of work cycles.

The labelling devices required for this method, for which the device disclosed in Unexamined West German Patent Application No. 32 09 053 is mentioned by way of illustrative example, basically consists of standard printing units usually provided with print wheels that carry the single printing types. The printing is effected by means of printing rollers ink distribution.

In this way, bar codes can also be printed on self-adhesive labels. Unexamined West German Patent Application No. 31 17 231 contains a printing unit for the printing of bar codes on self-adhesive labels that adhere to a carrier tape. The printer contains a print wheel on which are provided a plurality of type rings rotating relatively to one another about a common axis. The carrier tape, with the self-adhesive labels adhering thereto, is pressed against the print wheel by means of a print roller. To ensure that the bar codes to be printed can be read correctly by means of electro-optical readers, the print quality of the bar codes must meet stringent requirements with respect to uniformity and contact. To meet these requirements, the type rings are provided with a circular-cylindrical peripheral surface on which bar-code types of elastic material are formed which are in contact with an inking device. The print roller rotates about an axis running parallel to the axis of the type rings and is composed of a non-elastic material.

West German Unexamined Patent Application No. 28 16 161 discloses a labelling device which is also a hand printer. A thermoprinter of known construction is used as a printing unit for point or line printing, thermosensitive labels being placed on the carrier tape. In this method, the printer shall be used for printing out bar codes.

When using a thermoprinter, it is essential that the individual transport increment for the transport of the paper through the printer correspond to the dot-scanning pitch or dot-screen pitch of the individual resistor point, so that the quantity of the transport increment is identical to the length of the individual resistor point or is a multiple thereof.

However, the prior art methods and devices have several drawbacks. Due to the necessary smallness and mobility of the printing units of known construction working with type rings and printing ink, it is very difficult to produce precision-printed bar codes that can correctly be read by optical readers. Therefore, only stationary devices are simultaneously provided with means for reading a printed code. Particularly the checking of the just-printed printed image is of prime importance in order to eliminate sources of faults, such as faulty labelling. An indispensable requirement is also that such checking occur automatically and that only the faultiness of a just-printed label or code be shown to the operating personnel. Therefore, the printing and checking mode of the just-printed printed image must be as simple as possible, so that even sales personnel can deal with it. The drawbacks of the prior art continue to exist and the aforementioned requirements are not met by the devices and methods of the prior art.

Therefore, the major object of the invention is to provide a method and a device of the kind referred to in the introduction, in which the just-created printing image can be checked and, in case of a faulty printout or a faulty transmission thereof, this printing image can be rejected and the correct printing image can be read later as desired.

The method embodying the teachings of the invention include a method for printing and checking a printing image of an electrically-operated thermoprinter comprising the steps of inputting into the printer data to be printed; transporting through the printer a web of paper to be printed; printing the printing image on the paper wherein the printing image has a plurality of print lines and print characters for each print line are generated line by line; after printing of the first print line and prior to finishing printing of the printing image, scanning and sensing the just-printed portion of the printing image; comparing the sensed just-printed portion of the printing image with the input data; and upon detection of an error from the comparing step and prior to finishing printing of the printing image, rendering the printing image as unusable by the printer marking the printing image visually as a false print.

There are further embodiments of the invention wherein (1) the reflection of a single printed character is sensed and, if the reflection falls below a predetermined value, the printing image is marked unusable as a false print; (2) a reflection differential is generated to determine the transition between printed characters and an unprinted blank space or between a print line and an adjacent blank line and, if the reflection differential falls below a predetermined value, the printing image is marked unusable as a false print; (3) the printing image is a set of bar codes wherein the set of bar codes is printed along the length of the paper web with any desired length for the set of bar codes and, during the printing of the bar code set, the print lines comprising the bar codes are scanned and sensed by a sensing means moved relatively perpendicularly to the paper web and the printer during transport of the print paper; (4) a bar code of the set comprises a print line of the printing image and which bar code has its length printed perpendicular to the paper web with the width of the printing image being no greater than the length of the print line of the printer; (5) upon detection of an error, the remaining portion of the printing image to be printed is blackened by the printer to make it unusable and a black bar is printed; (6) the printing image is scanned and sensed by a sensing means moved from a margin-side neutral position relative to the paper web at a higher speed than the longitudinal movement of the paper web and the sensing means meanderingly scans the just-printed portion of the printing image in a reciprocating motion several times over a plurality of print lines, movement of the sensing means not being uniform and the non-linearity of the sensing means movement being corrected by controlling the printing velocity via the product: path x time; (7) the scanning and sensing of the printing image is by non-uniform movement of a sensing means relatively perpendicular to the paper web and the printer and the non-linearity of the sensing means movement is corrected by controlling the printing velocity via the product: path x time; (8) register marks are provided on the paper web for the positioning of the printing images, and sensing means senses from the margin side of the register marks for the positioning of the printing image and thereby controlling a start-of-print, and then reads the print line or the printing image after the sensing means senses another register mark; (9) the data is inputted to the printer manually by a keyboard; (10) the data is inputted to the printer automatically by computer or input data storage means; and (11) the paper is transported through the paper mechanically by motorized operation in relationship to the printing of the printing image and the scanning and sensing is by an opto-electronic sensor moved relatively perpendicularly to the paper web and the printer.

The method of the invention has the outstanding advantage that printing images containing a piece of information that is faulty compared to the correct information are immediately marked "false" and, for example, obliterated in a visual display. Thus, the operator who prints out the labels or codes sees immediately when a printing image does not produce the correct information. For example, in this case the rest of the printing image is blackened. Or at the end of the printing image and immediately thereafter a wide, black crossbar is printed. If the printing image produced is a bar code, the black crossbar is wider than the widest occurring code bar.

However, the printing image can also be marked as invalid in the case of errors other than the reproduction of false information, for example, if the reflection of the single character or of the bar code is inadequate and falls below a predetermined value. In this case, the printing image is marked as unusable if the code is not printed out adequately or printed too weakly. Advantageously, the printing image can also be marked as unusable if the transition between printed character or printed bars and the print-free voids adjacent thereto is not sufficiently sharp and has fallen below a specific value. Thus, the printed image is also marked as unusable if the edges of the characters are indistinct or blurred.

Therefore, the operator of the apparatus taught by the invention sees immediately when a label or a printing image is unusable, because in this case the label or the printing image is marked as unusable. Thus, the operator can immediately reject this label or printing image as unusable.

Advantageously, the method of the invention can be applied to hand units as well as to stationary equipment. Particularly useful is the method of the invention for hand printers with which merchandise to be priced with labels can be done on the spot.

A device for carrying out the method of the invention includes a thermoprinter and printing image checking apparatus comprising means for inputting and storing data to be printed; automated means for transporting a web of paper through the apparatus; a thermoprinter for printing a printing image on the paper including an electrically-actuated thermoprinting board having a resistor print line positioned transversely across the paper; an opto-electrical sensing means for reading at least a portion of the printing image printed on the paper, the sensing means being positioned adjacent the resistor print line and moveable relatively perpendicularly to the length of the paper with the velocity of the sensing means movement being at least equal to or greater than the transport velocity of the paper; and means for comparing the portion of the printing image read by the sensing means with the input data and, upon detection of an error, actuating the thermoprinter for marking at least a portion of the printing image visually as a false print. Further embodiments of the device of the invention include (1) a carrier plate wherein the thermoprinting board is mounted flat on the underside of said carrier plate and said resistor print line facing away from the underside of said carrier plate, the carrier plate having in the vicinity of said resistor print line a recess extending perpendicularly to the print line along the length of the print line and over which the paper web is moved, and wherein the sensing means is positioned above the recess on the top side of the carrier plate and moved along the recess perpendicularly to the paper web; (2) a guide bar, a swivel-mounted lever arm on the guide bar, and a carriage running on said guide bar and reciprocating by operation of said swivel-mounted lever arm; (3) cooling fins on the top side of the carrier plate turned away from the thermoprinting board; (4) a temperature sensor for sensing the temperature of the thermoprinting board; (5) the sensing means being an integrated infrared transmitter/receiver with a fucusing unit; (6) the thermoprinting board having a shift register into which the printing image is entered print line by print line, a clock-signal transmitter, and an AND element having a first input connected to output of the shift register and a second input connected to output of said clock-signal transmitter and an output connected to the resistor print line; (7) the apparatus comprising an integrated manual device having a program and data carrier exchangeable by the operator, a fixed-program unit, an alphanumerical keyboard, and a visual display unit; and (8) the thermoprinter printing a printing image comprising a set of bar codes, wherein the set of bar codes is printed along the length of the paper web with any desired length for the set of bar codes.

The device embodying the principles of the invention has the advantage that for the first time it combines in one device, particularly in a hand unit, a printer and a checking device for the printing image. Moreover, the customer can enter into the device from the outside a customer-specific control and computer program. In addition, the device of the invention has, besides a visual display and a fixed programmer, an alphanumeric keyboard for entering any data directly on the spot. For example, various currencies can be preselected with the fixed programmer. Furthermore, the device of the invention is small, of sturdy construction, and subject to few if any mechanical failures.

Thus, for the first time one can create with the method and the device of the invention printing images that can be checked while still in the process of being created and, in the event of an error, can immediately be marked in a visual display as invalid.

Furthermore, register marks can be provided on the paper for the positioning of the successive printing images. By means of these register marks, the feed rate of the motor transporting the paper and the start of printing for the individual printed image can be advantageously controlled.

The invention further includes a novel printing process wherein the printing image is generated continuously by means of this process. For example, if the printing image is a bar code, the single line bars are printed perpendicularly to the longitudinal axis of the paper web. In this case, all the resistors of the thermoprinting board print is parallel and the narrowest line bar is produced that has the width and height of the single resistor action point. Therefore, the printing length of the single resistor action point must correspond to the smallest line width of the code to be printed. Then, the width of a thicker code bar always corresponds to a multiple of the height of the single resistor action point. Again in this case, a drive technique must be ensured that operates with the highest degree of precision, because each drive technique must be able to transport the paper web by exactly the multiple of the line width of the thinnest code bar.

Therefore, with this printing process all the action points of the printer print simultaneously. This process can also be carried out with any other printing unit, e.g., with conventional printers, if they print with a sufficient degree of precision and ensure an accurate paper feed by a multiple of the length of the single print character. Nevertheless, this printing process can very elegantly be employed in conjunction with a thermoprinting board.

The above described printing process, in which the information is printed along the paper web and is later also read therealong, has a significant advantage over the prior art printing process in which the information is printed perpendicularly to the paper web and is later also read at right angles thereto. Namely, with the process of the invention a printing image of any length and, thereby, any quantity of information can be printed. With the conventional process, the length of the printing image is determined by the width of the paper web, since the width of the printing image, i.e., in the linear dimension of the paper web, contains no additional information compared to the first print line. The width of the printing image is thus only determined by the subsequent readability of the printing image.

When checking a printing image that has been printed along the paper web in conformity with the process taught by the invention, the sensor initially moves—e.g., controlled by a register mark on the paper—a little into the print line and is stopped there. Now, the print characters move continuously with the paper feed past the sensor, which thus reads the printing image at the speed of the paper web and can therefore terminate the checking of the printing image only after it has been completed. Thus, in order to indicate that the printing image is unusable, the printed image is obliterated immediately thereafter, e.g., by printing a black crossbar that is thicker than the thickest code bar used.

BRIEF DESCRIPTION OF THE DRAWINGS

Embodiments of the invention will be described in conjunction with the accompanying drawings, in which.

DETAILED DESCRIPTION OF THE PREFERRED EMBODIMENTS

In the ensuing description, "print line" or "line" is the character generation that produces the type print line of the printer. If a thermoprinting board is used, this is its resistor line.

Figure 1:
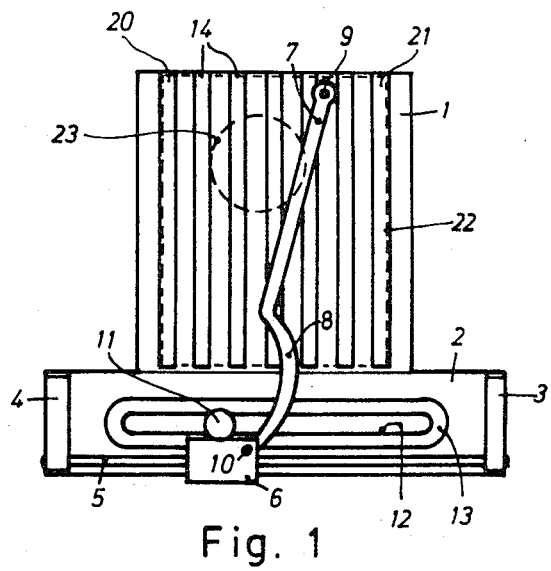
FIG. 1 is a top plan view of a device taught by the invention for carrying out the process of the invention, after removal of the cover plate and the drive motor.
Figure 3:
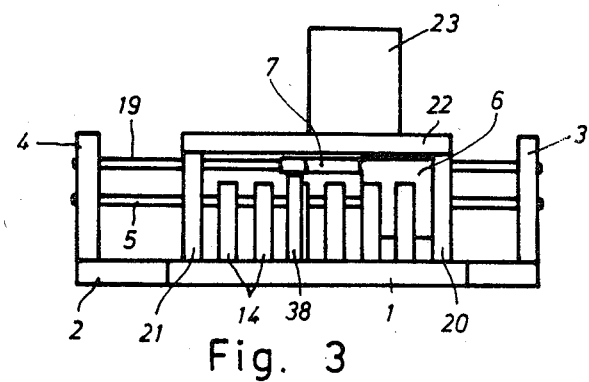
FIG. 3 is a view from the back on the transverse side of the carrier plate of the device of FIG. 1.

As shown in FIG. 1, the device taught by the invention comprises a carrier plate 1, which is preferably flat and elongated. To this carrier plate 1 there is fitted in one piece a plate-shaped transverse part 2, the carrier plate and the transverse part forming the basic component. The plate-shaped transverse part is fastened in its linear dimension to the transverse dimension of carrier plate 1, so that the ends of transverse part 2 rise thereabove. There are mounted on the ends of plate-shaped transverse part 2 lateral parts 3, 4 between which are mounted two guide bars 5 and 19 (FIG. 3). As apparent from FIG. 3, the guide bars are located at different heights. On the outer guide 5, a carriage 6 is mounted which can move back and forth on guide bar 5 in sliding contact therewith. To carriage 6 is hinged a guide arm 7 having a bent end portion 8 which is articulated with its external end in fulcrum 10 of carriage 6, with allowance for sliding. The other end of lever arm 7 is pivoted so as to rotate about pin 9 on carrier plate 1. For example, this pin 9 projects into a bearing bush 38 (FIG. 3). Thus, when lever 7 swivels about rotational axis 9, carriage 6 moves back and forth on guide bar 5.

In the plate-shaped transverse part 2 there is provided along the longitudinal axis thereof a longitudinal slot 12 which, for example, may be surrounded by a revolving recess 13. Carriage 6 carries an opto-electronic sensor which, for example, is an integrated infrared transmitter and an infrared receiver. All the leads to this sensor 11 have been omitted.

The carrier plate 1 carries on its upper surface lateral parts 20, 21 which are adjacent to its longitudinal edges. These lateral parts 20, 21 extend to the plate-shaped transverse part 2 (FIG. 1). A cover plate 22 (FIG. 3) is mounted on these lateral parts 20, 21 of carrier plate 1. On this cover plate 22, in turn, there are mounted an electromotor 23 and a toothed gear or a gear train (not shown). The drive shaft of motor 23 is connected to lever arm 7 by means of the toothed gear, a drive gear (not shown) being mounted on the lever arm. Upon activation of electromotor 23, lever arm 7 is swivelled by means of the toothed gear so that carriage 6 and thereby opto-electronic sensor 11 run properly through slot 12 within transverse part 2.

Figure 2:
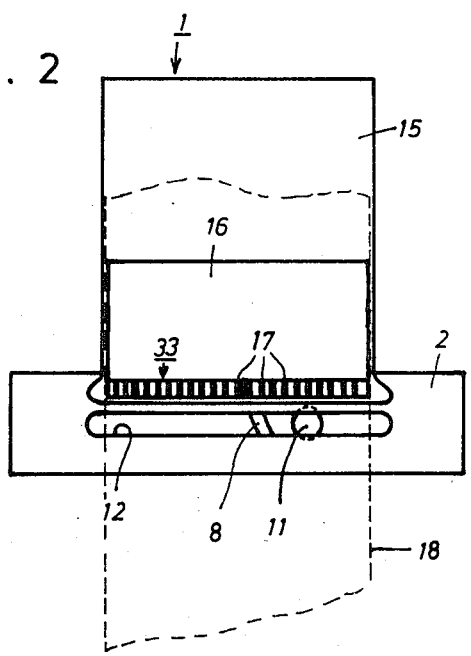
FIG. 2 is a top plan view of the bottom of the device of FIG. 1.

Furthermore, a thermoprinting board 16 is mounted on underside 15 of carrier plate 1, whereby, as shown in FIG. 2, print line 33 of thermoprinting board 16, i.e., the printing resistor line comprising the single resistor action points 17, is turned away from surface 15 of carrier plate 1. Resisprint line 33 of thermoprinting board 16 is placed in the immediate vicinity of longitudinal slot 12, which is longer than print line 33.

Moreover, thermoprinting board 16 can be introduced into the the underside 15 of carrier plate 1, so that the free underside 15 of the carrier plate, the thermoprinting board 16 and the lower surface of the plate-shaped 2 form a plane.

The device of the invention further comprises a conveyor means (not shown) for a paper web 18 which runs over the underside 15 of carrier plate 1 and over thermoprinting board 16 and thereby over the print line 33 of the single resistors 17. A pressure means (not shown) urges paper web 18 in the area of print line 33 of thermoprinting board 16 against said print line. The conveyor means also has a motor (not shown) for conveying paper web 18 through the printer. Thus, by means of the parts described above, paper web 18 is printed in such a way during the printing that the printing image on paper web 18 is printed on the side of paper web 18 turned toward the lower surface of transverse part 2 so that the printing image in the top plane view of FIG. 1 is visible in longitudinal slot 12.

This print line can now be read by means of optoelectronic sensor 11 within longitudinal slot 12 when carriage 6 is moved along slot 12 together with sensor 11.

To improve the guidance, a second guide bar 19 can also be used. To this end, a lever arm 24 engages guide bar 19. As a result, carriage 6 can be moved at a higher speed along guide bar 5.

Figure 4:
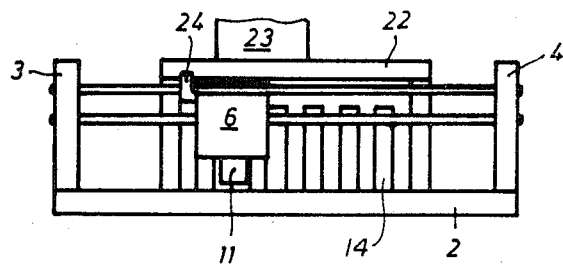
FIG. 4 is a view from the front on the longitudinal side of the transverse portion of the device of FIG. 1 with guide bars, carriage, and opto-electronic sensor.

Moreover, carrier plate 1 can have on its upper surface (FIGS. 1, 3, 4) cooling fins 14 which serve to dissipate the heat produced during the printing. These cooling fins 14 are arranged along the lateral parts 20, 21 of the carrier plate 1, with lever arm 7 moving freely between cover plate 22 and the upper end of the cooling fins 14. Thereby, mechanical protection is ensured for the lever arm within the housing comprised of the carrier plate, the side parts 20, 21, and the cover plate 22. The basic component comprising carrier plate and cross member is preferably made of metal, whereby the basic component including the cooling fins 14 can be milled in one piece from a block.

Figure 5:
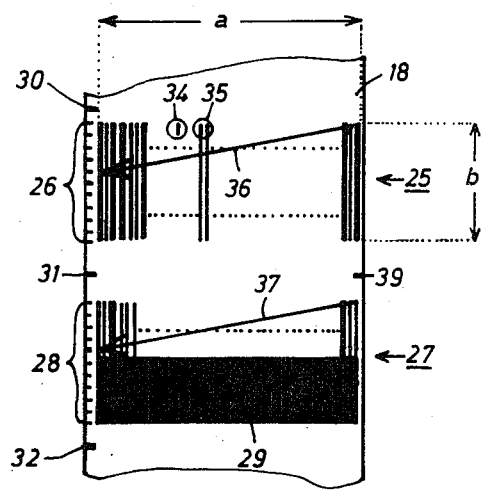
FIG. 5 is a schematic view showing the printing image on a paper strip, printed in conformity with a first embodiment of the process using the device of FIG. 1, in which the upper portion has a bar code scanned as "correct" and the lower portion a dash code scanned as "incorrect", and whose lower portion is therefore blackened.

FIG. 5 serves to explain the method embodying the invention, which can be carried out with the device described above.

To carry out the method of the invention, paper web 18 is transported by means of the conveyor means (not shown) including the associated motor via the underside 15 of carrier plate 1 and via the upper surface of the thermoprinting board 16 and via line print 33 formed by the single resistor action points 17. In the process, by means of a counterpressure mechanism (not shown), pressure is exerted on paper web 18 in the area of resistors 17. Now, when a number of resistors are heated, the paper, which is thermosensitive, will discolor at these sites. The maximum feed of paper web 18 through the printer shall correspond only to the length of the single resistor action point 17, so that the drive motor for the feed mechanism of paper web 18 can advantageously be a stepper motor.

The printing image is now produced in such a way that resistors 17 of print line 33 are heated in rows and the printing image is pressed perpendicularly to the paper web from top to bottom. It is not necessary that all of the resistors, which shall press in one line, be triggered simultaneously and, therefore, in parallel. Under appropriate control of the stepper motor—e.g., by initiating rest intervals—a print line can be printed in such a way that initially, e.g., one-third of the resistors performing the printing, is triggered per line, then two-thirds of the resistors performing the printing and, finally, the last one-third. Such a control can be of advantage in cases of extreme heat conditions or extremely long and constant printing images. In the example given, the stepper motor must of course cut out two steps between a switching step to convey the paper web until the whole line is printed. In this way, the printing image, e.g., a code, is printed perpendicularly and continuously from top to bottom.

In FIG. 5, a code is depicted as a printing image 25. Thus, printing image 25 comprises longitudinally extending code bars composed of rows of a multitude of n-lines 26. Thus, each black longitudinal bar of printing image 25 in FIG. 5 comprises a multitude of single print characters 34 whose length multiplied by the number n of lines produces the length of the printing image.

Now, after the first line or lines 26 of printing image 25 are printed, this just-started printing image becomes visible in longitudinal slot 12 due to the transport of paper web 18. If a code is printed, it can be determined already after completion of the first print line, whether the printing image is correct or incorrect, since the print information of the first line is repeated only n times. Thus, when the just-started printing image 25 passes through longitudinal slot 12, carriage 6, together with opto-electronic sensor 11, is moved over the just-started printing image and the printed information is displayed visually. To this end, sensor 11 can be an integrated infrared transmitter/receiver with focusing.

The signal reflected from the printing image 25 to sensor 11 can now be evaluated in several ways. On the one hand, the print information can be checked for correctness as to substance, that is, whether the generated, just-started printing image actually corresponds to the information that has been input and which originates either from a a manual input, a storage, or a computer. On the other hand, the reflection capability of the single printing character and, thereby, for example, the blackness of the single print character, can be measured. In addition, the differential of the reflection can be ascertained in order to determine the transition between a printed character 34 and an unprinted void 35. For example, the two last-mentioned measurements, i.e., the reflection of the printing image and the differential of the reflection, can be measured even with any printing image whose functional contents are not fixed prior to completion of the whole printing image.

This reading operation is performed very quickly, since the time required for the electronic checking of the data is negligibly small compared to the time required by the carriage to move along longitudinal slot 12. For example, FIG. 5 shows the motion vector 36 which is completed with the start of the fourth print line 26 of the reading by sensor 11. Therefore, if the code lengths are very short, the carriage (6) velocity with which the carriage moves perpendicularly to the paper web must be greater than the transport velocity of paper web 18 moving through the printer. If, on the other hand, longer code characters are generated, the sensor velocity may also be equal to, or greater than, the paper web velocity.

Now, if the checking electronic system detects an error either relative to the originally entered information, to the contrast, or to the marginal definition, the printer will be triggered automatically in such a way that the residual image 29 of printing image 27 is marked as unusable, e.g., it is blackened, as shown in the lower half of the image depicted in FIG. 5. Here, too, printing image 27 consists of a number of n lines 28 in which the upper four lines are, for example, printed as a bar code. Meanwhile, sensor 11 had read the just-printed printing image, which is shown by the motion vector 37. The checking electronic system has indicated that the printed information is unusable for some reason, so that the residual image 29 of printing image 27 still to be printed was marked as unusable. Immediately, this triggers for the operator in a visual display the signal telling him not to use this printing image as a label or as anything else, but to repeat the printing process once more.

Moreover, paper web 18 can be provided with register marks 30, 31, 32 and 39 that serve for the positioning of the single printing image. These register marks are likewise sensed by sensor 11, which thereby introduce the positioning and the start of printing. Thereupon, as described earlier, the sensor serves to check the printing image. For example, by means of these register marks, the motor of the feed mechanism and thereby the feed rate of paper web 18, 40 (FIGS. 6 and 7) can be controlled. Therefore, the infrared spectrum of the sensor serves a double purpose. The sensor reads the register marks for the positioning, then checks the printing image and, if necessary, reads on the other edge the nearest register mark, whereupon it crosses the paper web perpendicularly in the opposite direction to the next test procedure. These procedures for sensing the register marks and testing the printing image have nothing to do with one another, but can be carried out successively in a novel way in conformity with the teachings of the invention, using one and the same sensor.

It should further be pointed out that the movement of the sensor perpendicularly to the paper web shall not be uniform. The non-linearity of the speed can be corrected by software control via the product: path x time. Therefore, the single code bar need not be tested, but it suffices to integrate only the sum, for example, black and white over a predetermined time. This sum can simply be compared with the sum of black and white of the particular printing image in the storage or in the computer, so that the test program can be simply designed by means of software.

Also, an embodiment according to the method taught by the invention is suited to the reading, checking and obliterating of numerical codes, because when printing numbers line by line in conformity with the method described herein perpendicularly to the paper web from top to bottom, the number to be printed can only be fixed in a visual display if at least half the number is printed out along it height. In this case, the information is read one after another in a visual display during several reciprocating motions of sensor 11 until the generated number can be sensed by the test equipment. Until the whole printing image is completed, there still remains sufficient time to mark the remainder of the printing image as unusable. For the marking of the non-usability, it suffices that the printer, shortly before the end of the printing image, mark the non-usability over a few lines, e.g., by blackening. Then, a printing image marked as unusable can also be recognized as such if this marking consists only of a black line, larger or smaller in width and normal to the width of the paper. Under certain conditions, the method of the invention can also be used for letter codes.

Figure 6:
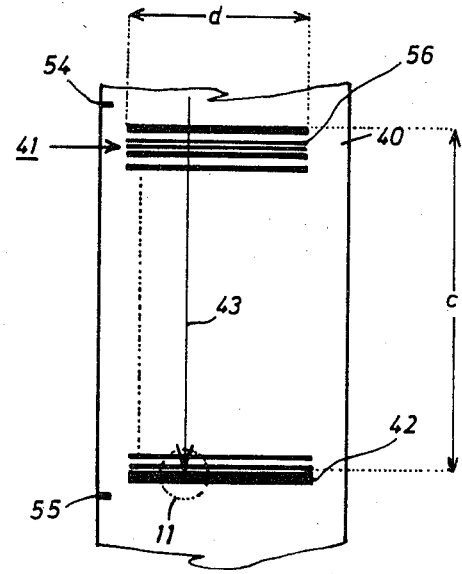
FIG. 6 is a schematic view showing the printing image on a paper strip, the printing image being printed along the paper strip in conformity with a second embodiment of the process using the device of FIG. 1, whereby the printing image can have any length in the linear dimension of the paper strip.

FIG. 6 depicts on a longitudinally extending paper web 40 and a paper web with no more than the width d of the printing image corresponding to the length of the print line of the printer. If the printer is a thermoprinting board, the width d of the printing image corresponds to the length of the resistor print line 49 formed by single resistors 50 of thermoprinting board 48 (FIG. 8).

This printing process for printing bar codes is in itself novel and possesses a number of advantages over the known printing of a bar code with a thermoprinting board. In this novel printing process, the printing image may have any length and thus contain any quantity of information. As a result, the design of the thermoprinting board and the triggering thereof can be greatly simplified.

Figure 8:
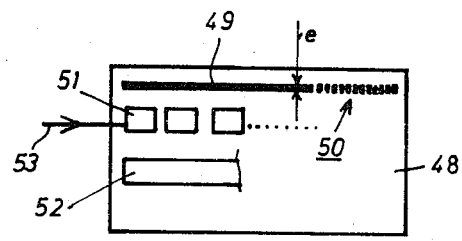
FIG. 8 is a schematic view showing a thermoprinting board with a continuous resistor bar and integrated electronic components as used in the device of FIG. 7.

For example and with further reference to FIGS. 6 and 8, to perform the printing and testing procedure in conformity with the invention, sensor 11 senses a margin-side register mark 54 on a paper web 40, thereby initiating the positioning of the next printing image and the start-of-print thereof. Now, all of the action points 50 of a print line, e.g., the whole resistor line 49 of the thermoboard 48, print the first code bar perpendicularly to the paper web, with the smallest line width of code bar 56 corresponding to the length of the single resistor action point. Advantageously, as shown in FIG. 8, the print line can be a continuous resistor bar 49, so that in this case the smallest line width of code bar 56 corresponds to the width e of resistor bar 49. The drive motor for feeding paper web 40 shall therefore advance the width e and a multiple thereof as the smallest transport increment.

To test printing image 41 directly after the positioning procedure, sensor 11 moves a little to the print line and is stopped there. Now, the single line bars and voids move line by line in the direction of arrow 43 in FIG. 6 and thereby lengthwise of the paper web below the sensor, which reads the print lines. After the last code bar of the printing image has moved past the sensor, the printing image is checked for correctness, such as described above in relationship to the previous figures. If an error is detected, a visually displayed obliteration of the printing image is reproduced. This obliteration may, for example, comprise a thick crossbar 42 shown in FIG. 6 thicker than the thickest code bar occurring.

Thereupon, sensor 11 can again be moved outwards in order, for example, to sense a subsequent register mark 55 on paper web 40.

Figure 7:
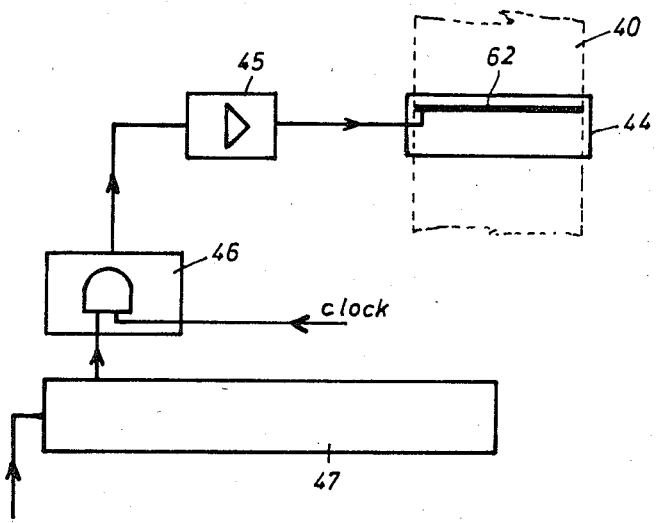
FIG. 7 is a block diagram showing a printer for the printing of the printing image of FIG. 6 in order to illustrate the triggering of the thermoprinting board.

Thermoboards 44, 48 for the longitudinal printing of the printing image and a trigger circuit are depicted in FIGS. 7 and 8. Thermoboard 48 has, for example, a resistor bar 49 which is continuous. Thus, the design of such a board is very simple. In addition, single resistor action points 50 may be arranged next to resistor bar 49 or therebelow.

A shift register 47 is used to trigger such a thermoboard 44, 48 in which the printing images, resolved after the single code bars, are entered one after the other. The output of the shift register is placed at one input of an AND element 46. At the other input there is applied a clock signal, e.g., of 100 kHz or more. The output signal is, for example, amplified in an amplifier 45 and triggers resistor print line 62 which may now comprise a resistor bar 49 or single resistor action points 50, all of which are energized simultaneously. In FIG. 8, the electronic components, such as shift register 52 and amplifier or ICs 51 are integrated on thermoboard 48 in multilayer thick-film technique. Element 53 is the clock signal lead.

Therefore, with continuous longitudinal printing of the printing image, the triggering of the printer is simplified because at any one time all of the print lines, which are merely switched on or off, carry out the printing. Thus, if a thermoprinting board is employed, its temperature can be sensed, whereby with rising temperature either the feed rate of the paper web is increased or the energizing time is reduced, e.g., by pulse duration modulation. Thus, the energizing time for the resistor print line can be simply controlled by means of the clock signal, depending upon the temperature of the resistor point line, or the paper feed is appropriately controlled by increasing multiples of the energization, with the energizing time remaining constant.

Figure 9:
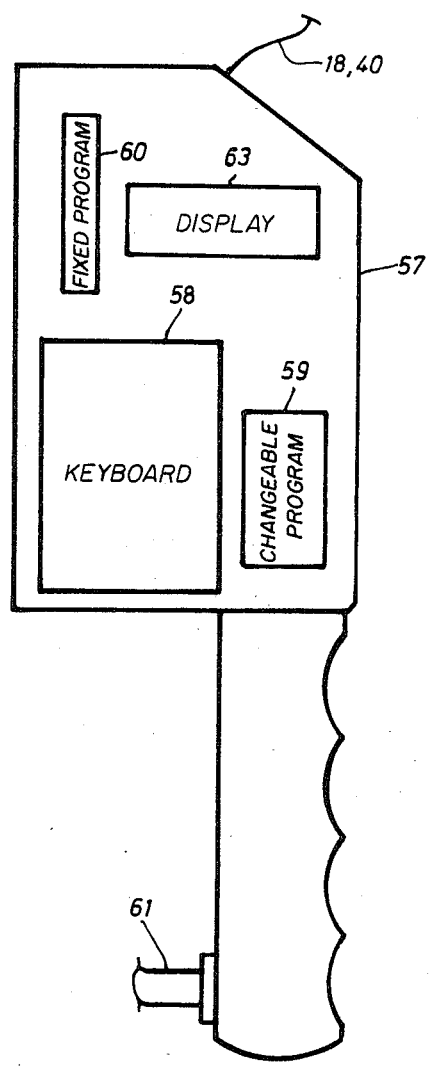
FIG. 9 is a schematic view showing the device of the invention as a hand unit.

FIG. 9 shows the apparatus of the invention embodied as a hand-operated instrument 57. This hand unit has an alphanumerical keyboard 58 for any desired variable input of information. Moreover, hand unit 57 has a fixed programmer 60 by means of which, for example, fixed programs such as various currencies can be entered. In addition, this hand unit has an externally exchangeable program carrier 59 which, for example, contains the customer-oriented programming data and programs. It also has a display element 63 and a current and external signal supply lead 61.

Furthermore, the method taught by the invention is not limited to thermoprinters. The checking of the printing image and its obliteration in the case of a false or unusable printing image is of course possible, independently of the creation of the printing image. Therefore, the method of the invention can also be applied to conventional printers as well, whose printing images are printed on the paper web by means of printing types and printing ink.

The method and apparatus taught by the invention can be used in all places where labelling is necessary, e.g., in warehouses for pricing by means of labelling tapes. The invention can also be used in the pharmaceutical industry for distributing and storing drugs.

In another embodiment of the invention, the process can be applied in such a way that a portion of the label is printed with a code, which is then read as described above and can be made unusable, if need be, and another portion of the label is provided with the price in plain text (in numbers). In this case, the consumer immediately sees the price of the merchandise so that such a labelling also complies with the pricing ordinance. Furthermore, the user benefits from the advantages of price coding, e.g., in the EAN code. Now, with a reading device the teller at the counter can read the code, as is customary today. In this case, the checking device can, of course, also compare the code print with the plain-text print to check the correctness and conformity with one another.

Advantageously, the method of the invention and the corresponding apparatus can also be used for self-testing the printer, particularly if a thermoboard is employed. To this end, a line is printed out as a so-called test line which, in this case, represents the whole printing image. Now, if a print character, e.g., a resistor point, is defective or gets soiled, this becomes immediately visible on the printout, because either a void appears or the printing image is defective. During the reading of this printing image by sensor 11 perpendicularly to the paperweb, this error is detected, whereupon an obliteration mark appears on the paper, or another method of signalling is used.

LIST OF REFERENCE NUMERALS

1: carrier plate
2: plate-shaped cross member
3,4: lateral parts of cross member 2
5: guide bar
6: carriage
7: lever arm
8: bent part of lever arm 7
9: axis of rotation
10: flexible fixing
11: opto-electronic sensor
12: longitudinal slot
13: recess
14: cooling fins
15: underside of carrier plate 1
16: thermoprinting board
17: resistors of thermoprinting board
18: paper web
19: guide bar
20,21: lateral parts of carrier plate 1
22: cover plate
23: motor
24: guide arm
25,27: printing image
26,28: print lines
29: blackened remainder of printing image 27
30,31,32: register marks on paper web 18
33: print line of printer 16
34: single character
35: single void
36,37: motion vectors of sensor 11 relative to paper web
38: bearing bush
39: register mark
40: paper web
41: printing image
42: obliteration bar
43: reading direction of sensor
44,48: thermoprinting boards 45,46: amplifier
46 AND element
47,52: shift registers
49: resistor print bar
50: single resistors
53: clock signal lead
54,55: register marks
56: thinnest line bar having the width of a single resistor
57: hand unit
58: alphanumerical keyboard
59: externally exchangeable programmer
60: fixed programmer
61: current and external signal supply lead
62: print line
63: display device

What is claimed is:

1. A method for printing and checking a printing image of an electrically-operated thermoprinter comprising the steps of:
   (a) inputting into the printer data to be printed;
   (b) transporting through the printer a web of paper to be printed;
   (c) printing the printing image on the paper wherein the printing image has a plurality of print lines and print characters for each print line are generated line by line;
   (d) after printing of the first print line and prior to finishing printing of the printing image, scanning and sensing the just-printed portion of the printing image;
   (e) comparing the sensed just-printed portion of the printing image with the input data; and
   (f) upon detection of an error from the comparing step and prior to finishing printing of the printing image, rendering the printing image as unusable by the printer marking the printing image visually as a false print.

2. The method of claim 1, wherein the reflection of a single printed character is sensed and, if the reflection falls below a predetermined value, the printing image is marked unusable as a false print.

3. The method of claim 1, wherein a reflection differential is generated to determine the transition between printed characters and an unprinted blank space or between a print line and an adjacent blank line and, if the reflection differential falls below a predetermined value, the printing image is marked unusable as a false print.

4. The method of claim 1, wherein the printing image is a set of bar codes wherein the set of bar codes is printed along the length of the paper web with any desired length for the set of bar codes and, during the printing of the bar code set, the print lines comprising the bar codes are scanned and sensed by a sensing means moved relatively perpendicularly to the paper web and the printer during transport of the print paper.

5. The method of claim 4, wherein a bar code of the set comprises a print line of the printing image and which bar code has its length printed perpendicular to the paper web with the width of the printing image being no greater than the length of the print line of the printer.

6. The method of claim 1, wherein, upon detection of an error, the remaining portion of the printing image to be printed is blackened by the printer to make it unusable and a black bar is printed.

7. The method of claim 1, wherein the printing image is scanned and sensed by a sensing means moved from a margin-side neutral position relative to the paper web at a higher speed than the longitudinal movement of the paper web and the sensing means meanderingly scans the just-printed portion of the printing image in a reciprocating motion several times over a plurality of print lines.

8. The method of claim 7, wherein the movement of the sensing means is not uniform and the non-linearity of the sensing means movement is corrected by controlling the printing velocity via the product: path x time.

9. The method of claim 1, wherein the scanning and sensing of the printing image is by non-uniform movement of a sensing means relatively perpendicular to the paper web and the printer and the non-linearity of the sensing means movement is corrected by controlling the printing velocity via the product: path x time.

10. The method of claim 1, wherein register marks are provided on the paper web for the positioning of the printing images, and sensing means senses from the margin side the register marks for the positioning of the printing image and thereby controlling a start-of-print, and then reads the print line or the printing image after the sensing means senses another register mark.

11. The method of claim 4, wherein register marks are provided on the paper web for the positioning of the printing images and a sensing means senses from the margin side the register marks for the positioning of the printing image and thereby controlling a start-of-print, and then reads the print line or the printing image after the sensing means senses another register mark.

12. The method of claim 6, wherein register marks are provided on the paper web for the positioning of the printing images and a sensing means senses from the margin side the register marks for the positioning of the printing image and thereby controls a start-of-print, and then reads the print line or the printing image after the sensing means senses another register mark.

13. The method of claim 10, wherein register marks are provided on the paper web for the positioning of the printing images and a sensor senses from the margin side the register marks for the positioning of the printing image and thereby controlling a start-of-print, and then reads the print line or the printing image after it senses another register mark.

14. The method of claim 1, wherein the data is inputted to the printer manually by a keyboard.

15. The method of claim 1, wherein the data is inputted to the printer automatically by computer or input data storage means.

16. The method of claim 1, wherein the paper is transported throught the paper mechanically by motorized operation in relationship to the printing of the printing image and the scanning and sensing is by an opto-electronic sensor moved relatively perpendicularly to the paper web and the printer.

17. A thermoprinter and printing image checking apparatus comprising:
   (a) means for inputting and storing data to be printed;
   (b) automated means for transporting a web of paper through the apparatus;
   (c) a thermoprinter for printing a printing image on the paper including an electrically-actuated thermoprinting board having a resistor print line positioned transversely across the paper;
   (d) an opto-electrical sensing means for reading at least a portion of the printing image printed on the paper, the sensing means being positioned adjacent the resistor print line and moveable relatively perpendicularly to the length of the paper with the velocity of the sensing means movement being at least equal to or greater than the transport velocity of the paper; and (e) means for comparing the portion of the printing image read by the sensing means with the input data and, upon detection of an error, actuating the thermoprinter for marking at least a portion of the printing image visually as a false print.

18. The apparatus of claim 17, further comprising a carrier plate wherein the thermoprinting board is mounted flat on the underside of said carrier plate and said resistor print line faces away from the underside of said carrier plate, the carrier plate having in the vicinity of said resistor print line a recess extending perpendicularly to the print line along the length of the print line and over which the paper web is moved, and wherein the sensing means is positioned above the recess on the top side of the carrier plate and moved along the recess perpendicularly to the paper web.

19. The apparatus of claim 18, further comprising a guide bar, a swivel-mounted lever arm on the guide bar, and a carriage running on said guide bar and reciprocating by operation of said swivel-mounted lever arm.

20. The apparatus of claim 18, further comprising cooling fins on the top side of the carrier plate turned away from the thermoprinting board.

21. The apparatus of claim 19, further comprising cooling fins on the top side of the carrier plate turned away from the thermoprinting board.

22. The apparatus of claim 18, further comprising a temperature sensor for sensing the temperature of the thermoprinting board.

23. The apparatus of claim 19, further comprising a temperature sensor for sensing the temperature of the thermoprinting board.

24. The apparatus of claim 20, further comprising a temperature sensor for sensing the temperature of the thermoprinting board.

25. The apparatus of claim 18, wherein said sensing means is an integrated infrared transmitter/receiver with a focusing unit.

26. The apparatus of claim 17, wherein the thermoprinting board has a shift register into which the printing image is entered print line by print line, a clock-signal transmitter, and an AND element having a first input connected to output of the shift register and a second input connected to output of said clock-signal transmitter and an output connected to the resistor print line.

27. The apparatus of claim 17, wherein the apparatus comprises an integrated manual device having a program and data carrier exchangeable by the operator, a fixed-program unit, an alphanumerical keyboard, and a visual display unit.

28. The apparatus of claim 18, wherein the apparatus comprises an integrated manual device having a program and data carrier exchangeable by the operator, a fixed-program unit, an alphanumerical keyboard, and a visual display unit.

29. The apparatus of claim 19, wherein the apparatus comprises an integrated manual device having a program and data carrier exchangeable by the operator, a fixed-program unit, an alphanumerical keyboard, and a visual display unit.

30. The apparatus of claim 20, wherein the apparatus comprises an integrated manual device having a program and data carrier exchangeable by the operator, a fixed-program unit, an alphanumerical keyboard, and a visual display unit.

31. The apparatus of claim 22, wherein the apparatus comprises an integrated manual device having a program and data carrier exchangeable by the operator, a fixed-program unit, an alphanumerical keyboard, and a visual display unit.

32. The apparatus of claim 26, wherein the apparatus comprises an integrated manual device having a program and data carrier exchangeable by the operator, a fixed-program unit, an alphanumerical keyboard, and a visual display unit.

33. The apparatus of claim 17, wherein the thermoprinter prints a printing image comprising a set of bar codes, wherein the set of the bar codes is printed along the length of the paper web with any desired length for the set of bar codes.

* * * * *